United States Patent
Gao et al.

(10) Patent No.: US 9,246,568 B2
(45) Date of Patent: Jan. 26, 2016

(54) APPARATUS AND METHOD FOR NON-CODEBOOK BASED PRECODING

(75) Inventors: Chun Yan Gao, Beijing (CN); Erlin Zeng, Beijing (CN); Xiang Guang Che, Beijing (CN); Shuang Tan, Changping District (CN); Kari Pekka Pajukoski, Oulu (FI); Kari Juhani Hooli, Oulu (FI); Peter Skov, Beijing (CN); Tommi Koivisto, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 507 days.

(21) Appl. No.: 13/389,668

(22) PCT Filed: Aug. 10, 2009

(86) PCT No.: PCT/EP2009/060313
§ 371 (c)(1),
(2), (4) Date: Apr. 6, 2012

(87) PCT Pub. No.: WO2011/018102
PCT Pub. Date: Feb. 17, 2011

(65) Prior Publication Data
US 2012/0188962 A1    Jul. 26, 2012

(51) Int. Cl.
*H04W 72/04* (2009.01)
*H04B 7/06* (2006.01)
*H04B 7/04* (2006.01)

(52) U.S. Cl.
CPC ............ *H04B 7/0621* (2013.01); *H04B 7/0434* (2013.01); *H04B 7/0617* (2013.01); *H04B 7/0636* (2013.01)

(58) Field of Classification Search
CPC ................................ H04W 84/18; H04W 84/12
See application file for complete search history.

(56) References Cited

U.S. PATENT DOCUMENTS

| | | | | |
|---|---|---|---|---|
| 2009/0067530 A1* | 3/2009 | Ashikhmin | .......... | H04B 7/0417 375/267 |
| 2010/0254473 A1* | 10/2010 | Wu | .......... | H04B 7/0434 375/267 |
| 2011/0141876 A1* | 6/2011 | Kuchi | .......... | H04B 7/0413 370/203 |
| 2012/0009960 A1* | 1/2012 | Baldemair | .......... | H04B 7/0426 455/507 |

FOREIGN PATENT DOCUMENTS

WO    WO2008/125021 A1    10/2008

OTHER PUBLICATIONS

3rd Generation Partnership Project, "LTE; Evolved Universal Terrestrial Radio Access (E-UTRA); Physical channels and modulation": 3GPP TS 36.211 version 9.0.0 Release 9, pp. 47-68, Apr. 2009, http://www.etsi.org/deliver/etsi_ts/136200_136299/136211/08.06.00_60/.*

(Continued)

*Primary Examiner* — Raj Jain
*Assistant Examiner* — Zhiren Qin
(74) *Attorney, Agent, or Firm* — Harrington & Smith

(57) ABSTRACT

An apparatus and a method are provided. The provided solution includes a controller configured to determine a transmission mode for user equipment, the transmission mode including non-codebook precoding with fixed precoding granularity; and to control a transceiver to transmit information on the selected transmission mode to the user equipment.

29 Claims, 5 Drawing Sheets

(56) References Cited

OTHER PUBLICATIONS

3rd Generation Partnership Project, "LTE; Evolved Universal Terrestrial Radio Access (E-UTRA); Base Station (BS) radio transmission and reception (3GPP TS 36.104 version 8.6.0 Release 8)", p. 16, Jul. 2009, http://www.etsi.org/deliver/etsi_ts/136100_136199/136104/08.06.00_60/.*

3rd Generation Partnership Project, "LTE; Evolved Universal Terrestrial Radio Access (E-UTRA); Multiplexing and channel coding (3GPP TS 36.212 version 8.6.0 Release 8)", p. 22-30, Apr. 2009, http://www.etsi.org/deliver/etsi_ts/136200_136299/136212/08.06.00_60.*

3rd Generation Partnership Project, "LTE; Evolved Universal Terrestrial Radio Access (E-UTRA); Physical layer procedures (3GPP TS 36.213 version 8.6.0 Release 8", p. 49-52, Apr. 2009, http://www.etsi.org/deliver/etsi_ts/136200_136299/136213/08.06.00_60/.*

R1-090943, 3GPP TSG RAN WG1 #56, "Non-codebook-based Precoding for Uplink transmission", CATT, CMCC, RITT, Athens, Greece, Feb. 9-13, 2009, 6 pgs.

R1-091775, 3GPP TSG RAN WG1 Meeting #57, "Performance and implementation requirement of non-codebook precoding", Nokia, Nokia Siemens Networks, San Francisco, USA, May 4-8, 2009, 7 pgs.

* cited by examiner

APPARATUS AND METHOD FOR NON-CODEBOOK BASED PRECODING

FIELD

The embodiments of the invention relate generally to communication networks and, more particularly, to an apparatus and a method in communication networks.

BACKGROUND

Wireless communication systems are constantly under development. Developing systems provide a cost-effective support of high data rates and efficient resource utilization. One communication system under development is the 3rd Generation Partnership Project (3GPP) Long Term Evolution (LTE) Release 8. An improved version of the Long Term Evolution radio access system is called LTE-Advanced (LTE-A). The LTE is designed to support various services, such as high-speed data, multimedia unicast and multimedia broadcast services.

In wireless communication systems, multiple antennas can be used in reception and/or transmission for improving link reliability and/or increasing transmission rate. In solutions based on multiple antennas, precoding can be used to improve performance of a multiple antenna system. Precoding is usually used in transmitters to mitigate distortion introduced by channel response and/or equalizers used in receivers.

There are two common ways of realizing precoding. Precoding may be realized as a codebook-based or non-codebook-based solution. A transmitter and a receiver may have a common precoding codebook, i.e. a finite collection of precoding vectors or precoding matrices. The receiver, for example a mobile station, typically decides which vector or vectors of the codebook are selected for use and feedbacks its index to a transmitter, for example an eNodeB, on a feedback channel.

In non-codebook precoding, channel state information (CSI) is usually furnished to a transmitter by using a feedback signal from a receiver in a frequency division duplex (FDD) mode or in time division duplex (TDD) mode by using the reciprocity principle. Alternatively, in FDD mode, the receiver may decide on antenna weighting and feedback this information via a feedback channel.

BRIEF DESCRIPTION

The following presents a simplified summary of the invention in order to provide basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention, there is provided an apparatus comprising: a controller. The apparatus may be configured to determine a transmission mode for user equipment, the transmission mode comprising non-codebook precoding with fixed precoding granularity; control a transceiver to transmit information on the selected transmission mode to the user equipment.

According to an aspect of the present invention, there is provided an apparatus comprising: a controller configured to map an uplink transmission parameter comprising at least a resource bandwidth or transmission rank to precoding granularity of non-codebook precoding; determine a transmission mode for a user equipment, the transmission mode comprising non-codebook precoding; select a transmission parameter comprising at least a resource bandwidth or transmission rank; control a transceiver to transmit information on the selected transmission parameter.

According to another aspect of the present invention, there is provided an apparatus comprising: a transceiver configured to receive from a network element information on a transmission mode, the transmission mode comprising non-codebook precoding with fixed precoding granularity; and a controller configured to control the transceiver to apply the transmission mode with the fixed precoding granularity in transmission.

According to another aspect of the present invention, there is provided an apparatus comprising: a controller configured to map an uplink transmission parameter comprising at least a resource bandwidth or transmission rank to precoding granularity of non-codebook precoding; control a transceiver to receive from a network element information on a transmission mode, the transmission mode comprising non-codebook precoding; control a transceiver to receive a transmission parameter comprising at least a resource bandwidth or transmission rank; determine precoding granularity on the basis of the transmission parameter; and control the transceiver to apply the transmission mode with the determined precoding granularity in transmission.

According to another aspect of the present invention, there is provided a method comprising determining a transmission mode for user equipment, the transmission mode comprising non-codebook precoding with a fixed precoding granularity; transmitting information on the selected transmission mode to the user equipment.

According to another aspect of the present invention, there is provided a method comprising: mapping an uplink transmission parameter comprising at least a resource bandwidth or transmission rank to precoding granularity of non-codebook precoding; determining a transmission mode for a user equipment, the transmission mode comprising non-codebook precoding; selecting a transmission parameter comprising at least a resource bandwidth or transmission rank, controlling a transceiver to transmit information on the selected transmission parameter.

According to another aspect of the present invention, there is provided a method comprising: receiving from a network element information on a transmission mode, the transmission mode comprising non-codebook precoding with a fixed precoding granularity; and applying the transmission mode with the fixed precoding granularity in transmission.

According to another aspect of the present invention, there is provided a method comprising: mapping an uplink transmission parameter comprising at least a resource bandwidth or transmission rank to precoding granularity of non-codebook precoding; receiving from a network element information on a transmission mode, the transmission mode comprising non-codebook precoding; receiving a transmission parameter comprising at least a resource bandwidth or transmission rank; determining precoding granularity on the basis of the transmission parameter; and controlling the transceiver to apply the transmission mode with the determined precoding granularity in transmission.

According to another aspect of the present invention, there is provided an apparatus comprising: means for determining a transmission mode for user equipment, the transmission mode comprising non-codebook precoding with fixed precoding granularity; and means for controlling the transmission of information on the selected transmission mode to the user equipment.

According to another aspect of the present invention, there is provided an apparatus comprising: means for mapping an uplink transmission parameter comprising at least a resource bandwidth or transmission rank to precoding granularity of non-codebook precoding; means for determining a transmission mode for a user equipment, the transmission mode comprising non-codebook precoding; means for selecting a transmission parameter comprising at least a resource bandwidth or transmission rank, and means for controlling the transmission of information on the selected transmission parameter.

According to another aspect of the present invention, there is provided an apparatus comprising: transceiving means for receiving from a network element information on a transmission mode, the transmission mode comprising non-codebook precoding with fixed precoding granularity; and means for controlling the transceiving means to apply the transmission mode with the fixed precoding granularity in transmission.

According to another aspect of the present invention, there is provided an apparatus comprising: means for mapping an uplink transmission parameter comprising at least a resource bandwidth or transmission rank to precoding granularity of non-codebook precoding; means for controlling the reception of information on a transmission mode, the transmission mode comprising non-codebook precoding; means for controlling the reception of a transmission parameter comprising at least a resource bandwidth or transmission rank; means for determining precoding granularity on the basis of the transmission parameter; and means for controlling the applying of the transmission mode with the determined precoding granularity in transmission.

A chipset may comprise the apparatus discussed above.

According to another aspect of the present invention, there is provided a computer program comprising program code means adapted to perform the methods discussed above.

According to another aspect of the present invention, there is provided an article of manufacture comprising a computer readable medium and embodying program instructions thereon executable by a computer operably coupled to a memory which, when executed by the computer, perform methods discussed above.

Although the various aspects, embodiments and features of the invention are presented independently, it should be appreciated that all combinations of the various aspects, embodiments and features of the invention are possible and within the scope of the present invention as claimed.

LIST OF DRAWINGS

Embodiments of the present invention are described below, by way of example only, with reference to the accompanying drawings, in which FIG. 1 shows a simplified block diagram illustrating an exemplary system architecture;

DESCRIPTION OF EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of the present invention are applicable to any user terminal, server, corresponding component, and/or to any communication system or any combination of different communication systems where precoding is utilized. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1:
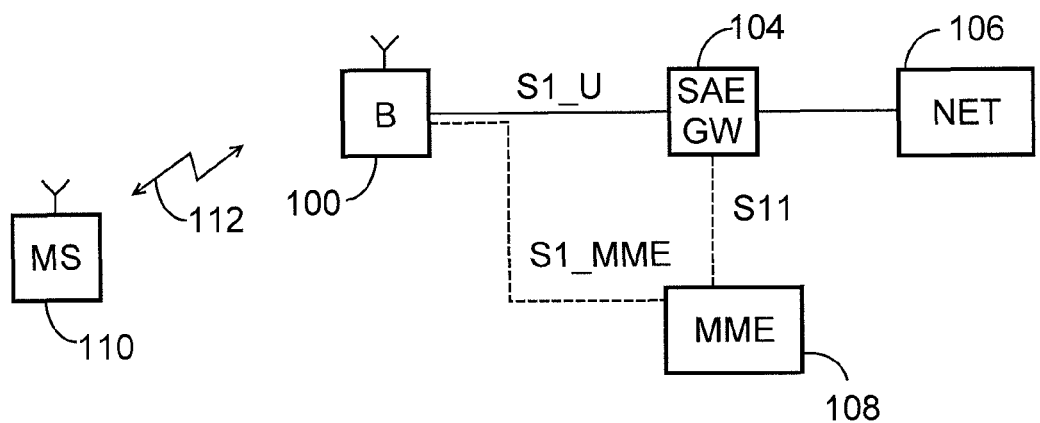

With reference to FIG. 1, let us examine an example of a radio system to which embodiments of the invention can be applied. In this example, the radio system is based on LTE-A network elements. However, the invention described in these examples is not limited to the LTE-A radio systems but can also be implemented in other radio systems.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here. The exemplary radio system of FIG. 1 comprises a service core of an operator including the following elements: an MME (Mobility Management Entity) 108 and an SAE GW (SAE Gateway) 104.

A base station that may also be called eNB or eNodeB (Enhanced node Bs) 100 of the radio system host the functions for Radio Resource Management: Radio Bearer Control, Radio Admission Control, Connection Mobility Control, Dynamic Resource Allocation (scheduling). The MME 108 is responsible for distributing paging messages to the eNodeB 100. The eNodeB is connected to the SAE GW with an S1_U interface and to MME with an S1_MME interface. The eNodeBs of a system may be connected to each other with X2 interface (not shown). FIG. 1 shows a set of user equipment 110 located in the service area of the eNodeB 100. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In the example situation of FIG. 1, the user equipment 110 has a connection 112 with the eNodeB 100. The connection 112 may relate to a call/a service which may be "long distance" where user traffic passes via the SAE GW 104. For example, a connection from the user equipment 110 to an external IP network, such as to the Internet 106, may be guided via the SAE GW 108. However, local calls/services are also possible in the exemplary radio system.

FIG. 1 only illustrates a simplified example. In practice, the network may include more base stations and radio network controllers, and more cells may be formed by the base stations. The networks of two or more operators may overlap, the sizes and form of the cells may vary from what is depicted in FIG. 1, etc.

The physical layer of the LTE includes orthogonal frequency division multiple access (OFDMA) and multiple-input and multiple-output (MIMO) data transmission. For example, the LTE deploys the OFDMA for the downlink transmission and single carrier frequency division multiple access (SC-FDMA) for the uplink transmission. In OFDMA, the transmission frequency band is divided into multiple sub-carriers orthogonal to each other. Each sub-carrier may transmit data to a specific UE. Thus, multiple access is achieved by assigning subsets of sub-carriers to any individual UE. SC-FDMA utilizes single carrier modulation, orthogonal frequency domain multiplexing and frequency domain equalization. Embodiments of the invention are not limited to any particular multiple access method.

The LTE-A provides a physical uplink control channel (PUCCH) as an uplink access link from the UE 110 to the base stations or eNodeB 100. The PUCCH may be used to transmit control information to the base stations or eNodeBs indicating an acknowledgement (ACK)/a negative-ACK (NACK), a measure of a channel quality and/or a scheduling request (SR). In addition, PUCCH transmissions may comprise demodulation reference symbols/signals (DMRS). A physical uplink shared channel (PUSCH) is provided for sending data from the UE 110 to the base station.

In downlink direction, user equipment of an LTE based system may be configured to receive control and data signals on a physical downlink control channel (PDCCH) or on a physical downlink shared channel (PDSCH). PDCCH is transmitted on an aggregation of several consecutive control channel elements (CCE). The aggregations follow a tree structure.

In an embodiment, the user equipment 110 communicates with the eNodeB using single user multiple input multiple output (SU-MIMO). In SU-MIMO, user equipment utilizes more than one antenna in communicating with eNodeBs. Typically, the number of antennas may be two to four. However, the number of antennas is not limited to any specific number. SU-MIMO has been suggested to be applied in the LTE-A communication system.

It should be appreciated that the communication system may also comprise other core network elements besides SAE GW 104 and MME 108. Direct communication between different eNodeBs over an air interface is also possible by implementing a relay node concept, wherein a relay node may be considered as a special eNodeB having wireless backhauls or, for instance, X2 and S1 interfaces relayed over the air interface by another eNodeB. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet Protocol (IP) connections.

Figure 2A:
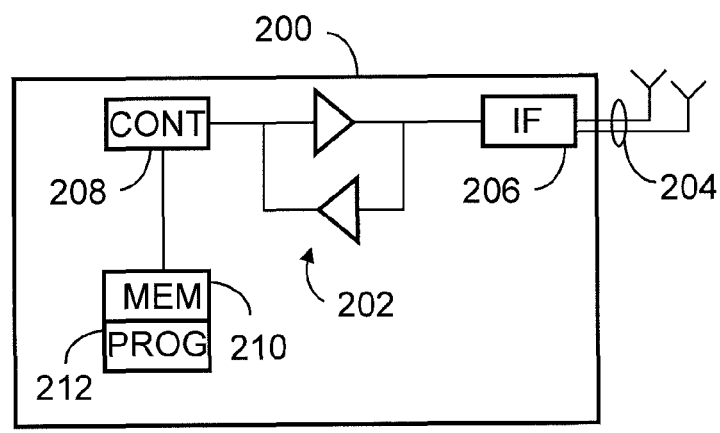
FIGS. 2A and 2B illustrate examples of apparatuses where embodiments of the invention may be applied
Figure 2B:
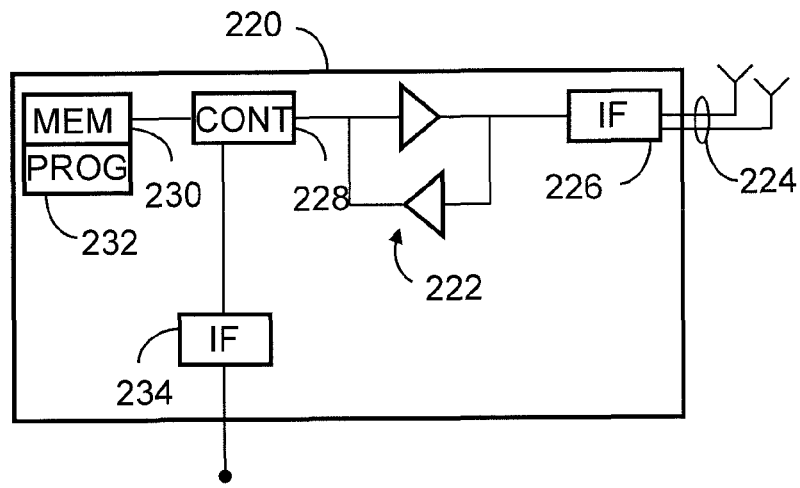

FIGS. 2A and 2B illustrate examples of apparatuses where embodiments of the invention may be applied. FIG. 2A illustrates an example of user equipment. The user equipment 200 comprises a transceiver 202 configured to communicate with one or more network elements such as ENodeB. The transceiver 202 may be connected to an antenna arrangement 204 via an interface 206. The antenna arrangement may comprise a set of antennas or antenna elements. The user equipment comprises a controller or processing unit 208 for controlling the functions of the user equipment. The controller 208 is typically implemented with a microprocessor, a signal processor or separate components and associated software. The user equipment may comprise a memory 210 connected to the controller 208. The memory may store various software 212 and data required in the operation of the apparatus. The memory may be integrated in the controller. In addition, the user equipment 200 may further comprise user interface (not shown). The user interface may be realized with a display, a keyboard, a microphone and a speaker.

FIG. 2B illustrates an example of a network element 220. The network element 220 comprises a transceiver 222 configured to communicate wirelessly with one or more user equipment. The transceiver 222 may be connected to an antenna arrangement 224 via an interface 226. The antenna arrangement may comprise one or more antennas or antenna elements. The network element comprises a controller or processing unit 228 for controlling the functions of the network element. The controller 228 is typically implemented with a microprocessor, a signal processor or separate components and associated software. The network element 220 may comprise a memory 230 connected to the controller 228. The memory may store various software 232 and data required in the operation of the apparatus. The memory may be integrated in the controller. The network element may be connected to other network elements and to Internet via an interface 234 connected to the controller 228.

As stated above, precoding may be applied in MIMO systems to increase link reliability and/or increasing transmission rate. Non-codebook precoding has some advantages over codebook based precoding. For example, an eNodeB need not include a precoding matrix index (PMI) indication in uplink grant message sent to user equipment. Frequency selective precoding may be used without increasing PMI signaling overhead. In addition, non-codebook precoding enables a more accurate precoding matrix and better performance.

Though non-codebook-based frequency selective precoding has potential gain over wideband codebook precoding which uses only one PMI for all the allocated bandwidth, the gain can be achieved only when the precoding granularity is known by both eNodeB and user equipment. The precoding granularity means the frequency allocation size where the precoding coefficients remain constant. If the precoding granularity is unknown to the eNodeB and determined by user equipment, there is a performance loss which deteriorates frequency selective non-codebook precoding performance. The performance loss is due to increased channel estimation loss. The channel estimation loss is increased, because frequency selective precoding changes the coherence properties of radio channel seen on the receiver side. Additionally, if the precoding granularity is set too small, it destroys the orthogonality of DMRS used for separating MIMO layers.

Figure 3A:
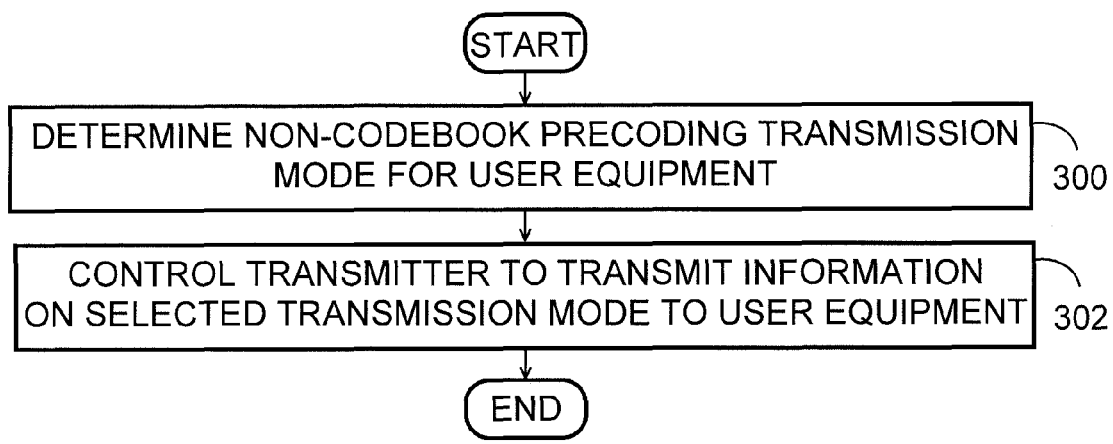
FIGS. 3A to 3C are flow charts illustrating embodiments of the invention.

FIG. 3A is a flow chart illustrating an embodiment of the invention. In this embodiment, a fixed non-codebook precoding granularity is utilized. The fixed granularity may be signaled to the user equipment using PDCCH or higher layer signaling. One of the advantages of this solution is that precoding with fixed granularity size may be realized at low cost in an eNodeB, since the eNodeB does not need to implement multiple channel estimation filter window sizes. Only low signaling overhead is introduced.

The fixed precoding granularity may require specific rules for some of the allocated bandwidths, e.g., for resource allocation of 5 PRBs. The use of fixed precoding granularity of e.g. 2 PRB is not straightforward with 5 PRB resource allocation, and a specific rule of, for example, use of 2 PRB and 3 PRB granularity may be needed.

In step 300, a transmission mode for user equipment is determined. The transmission mode comprises non-codebook precoding with a fixed precoding granularity. The granularity may be a predetermined number of Physical Resource Blocks (PRB).

In step 302, a controller 228 of an eNodeB controls a transceiver 202 of the eNodeB to transmit information on the selected transmission mode to the user equipment.

In an embodiment, the controller is configured to indicate the used transmission mode to the user equipment in Layer 1 control information. The bit can be newly added or borrowed from an existing uplink grant message.

Figure 3B:
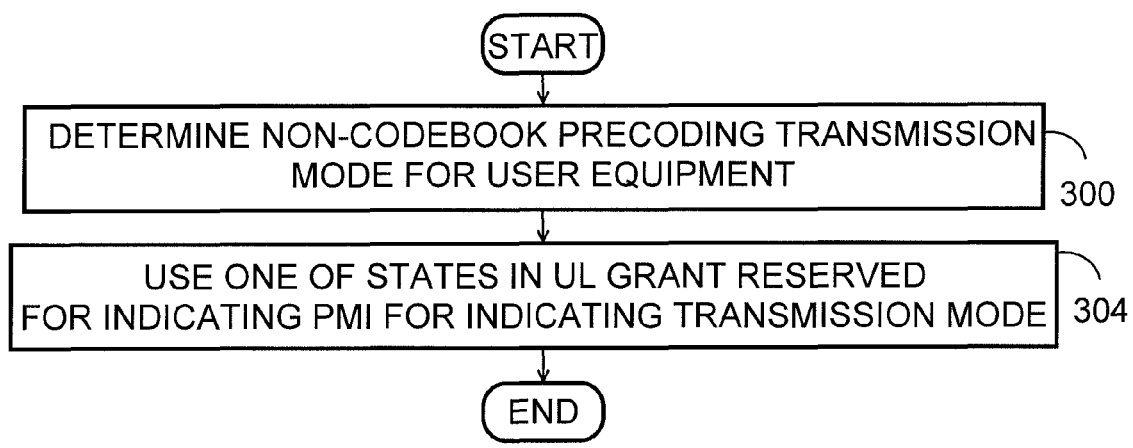

FIG. 3B is a flow chart illustrating an embodiment of the invention. The first step 300 is the same as in FIG. 3A.

In step 304, the controller is configured to use one bit of an uplink grant message for indicating the transmission mode. In an embodiment, a state of precoding matrix index (PMI) in the uplink grant message may be used to indicate the determined transmission mode. For example, if the size of the precoding codebook is 7, a three-bit PMI is required to transmit the selected codebook state to user equipment. However, a three-bit PMI can support eight states. Thus the extra state may be utilized to indicate the non-codebook transmission mode with fixed precoding granularity.

Figure 3C:
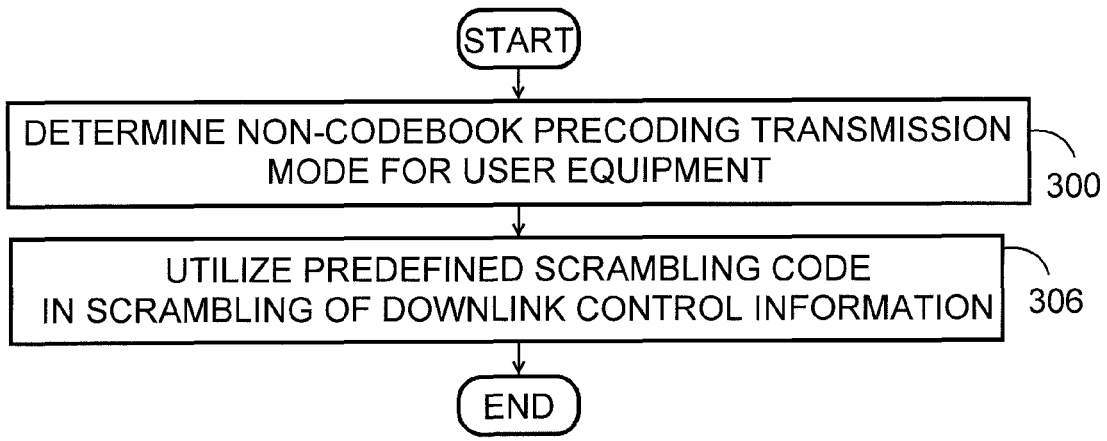

FIG. 3C is a flow chart illustrating an embodiment of the invention. The first step 300 is the same as in FIG. 3A.

In step 306, the controller is configured to utilize a predetermined scrambling code in the scrambling of downlink control information. The use of the predetermined scrambling code is an indication of the non-codebook transmission mode with fixed precoding granularity. For example, if the eNodeB determines to utilize non-codebook based precoding with fixed granularity, the eNodeB may scramble the Cyclic Redundancy Check (CRC) parity bits of Downlink Control Information (DCI) information with certain scrambling code known by both the eNodeB and the user equipment.

Figure 4A:
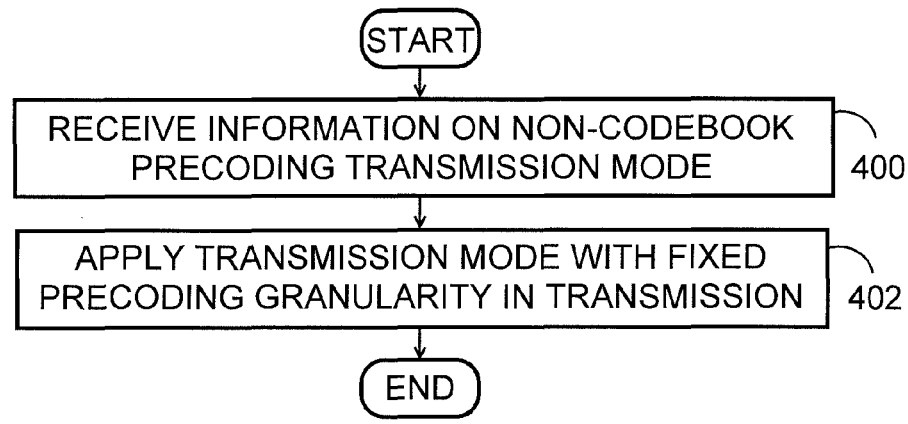
FIGS. 4A to 4D are flow charts illustrating further embodiments of the invention.

FIG. 4A is a flow chart illustrating an embodiment of the invention from the user equipment point of view.

In step 400, the user equipment receives from a network element information on a transmission mode, the transmission mode comprising non-codebook precoding with fixed precoding granularity.

In step 402, the user equipment applies the transmission mode with the fixed precoding granularity in transmission.

Figure 4B:
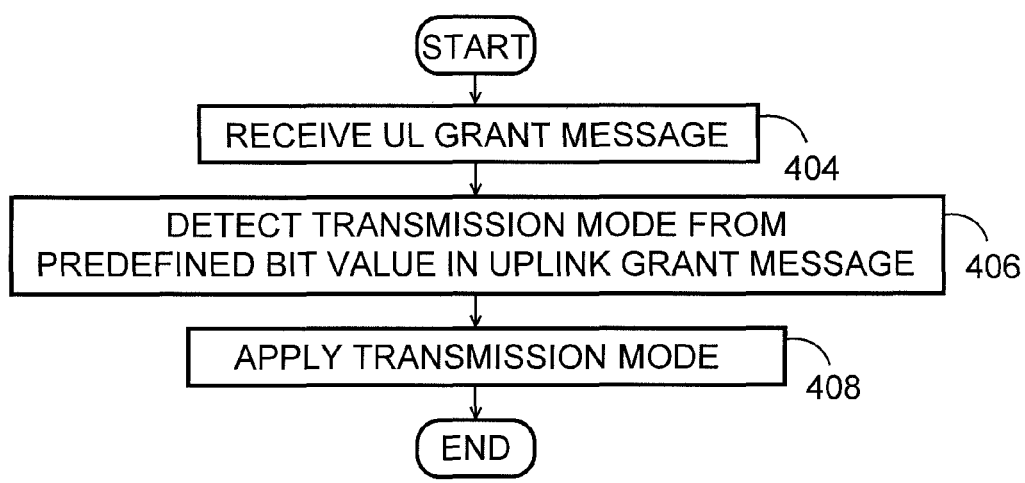

FIG. 4B is a flow chart illustrating an embodiment.

In step 404, the transceiver 202 of the user equipment 200 receives an uplink grant message.

In step 406, the controller 208 of the user equipment detects the transmission mode from a predefined value of a bit in an uplink grant message. The bit can be newly added or borrowed from an existing uplink grant message.

In step 408, the user equipment applies the transmission mode with the fixed precoding granularity in transmission.

Figure 4C:
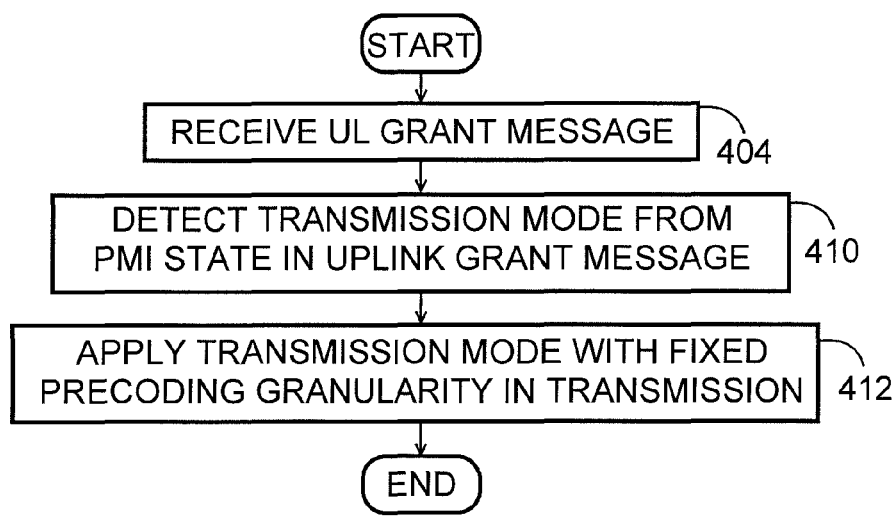

FIG. 4C is a flow chart illustrating another embodiment.

In step 404, the transceiver 202 of the user equipment 200 receives an uplink grant message.

In step 410, the controller 208 of the user equipment detects the transmission mode from the state of precoding matrix index (PMI) in the uplink grant message. As discussed above in connection with FIG. 3B, a predefined state of PMI may be used to indicate the determined transmission mode.

In step 412, the user equipment applies the transmission mode with the fixed precoding granularity in transmission.

Figure 4D:
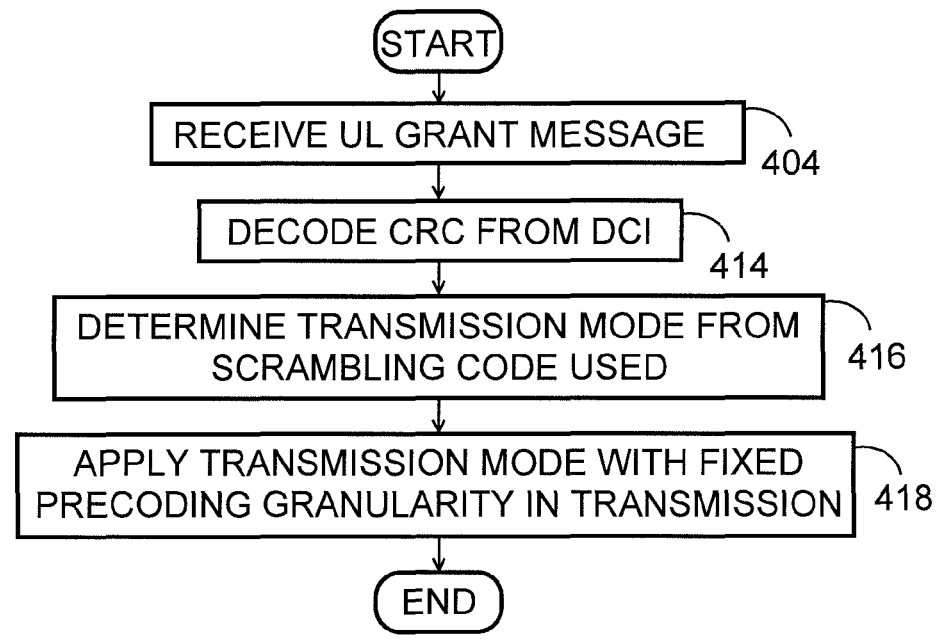

FIG. 4D is a flow chart illustrating another embodiment.

In step 404, the transceiver 202 of the user equipment 200 receives an uplink grant message.

In step 414, the controller 208 of the user equipment decodes the CRC parity bits from the DCI. By using blind decoding, the user equipment will be able to determine which scrambling code is used.

In step 416, the controller 208 of the user equipment determines the transmission mode from the scrambling code is used.

In step 418, the user equipment applies the transmission mode with the fixed precoding granularity in transmission.

Figure 5A:
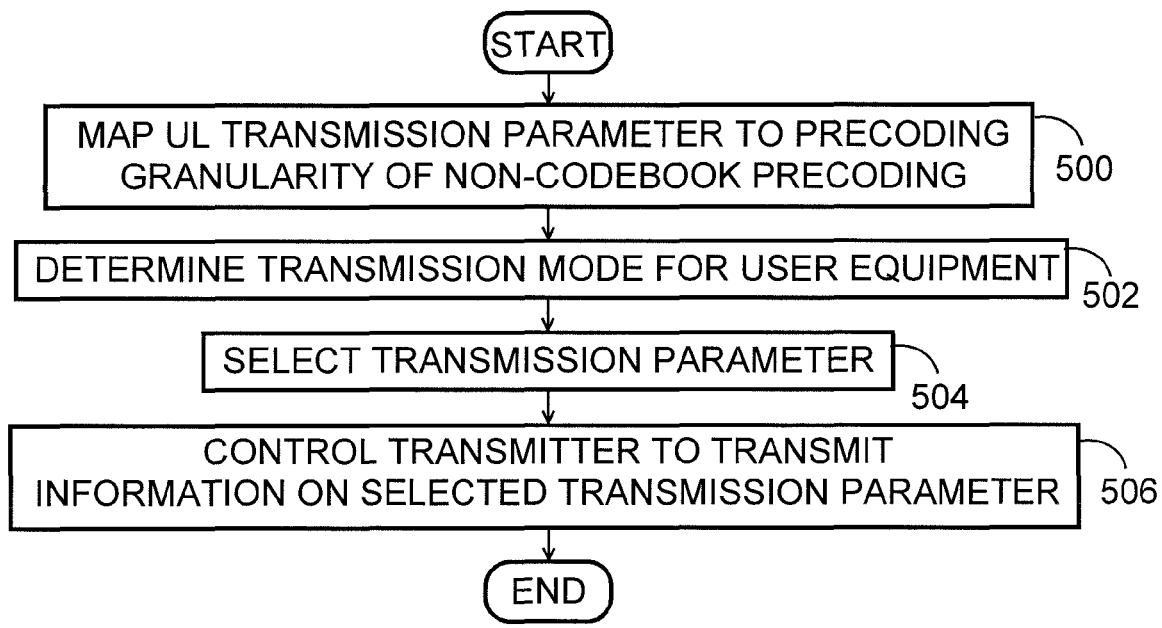
FIGS. 5A and 5B are flow charts illustrating further embodiments of the invention.

FIG. 5A is a flow chart illustrating an embodiment of the invention. In this embodiment, an implicit mapping between uplink resource allocation and the precoding granularity of non-codebook precoding is predefined. In another embodiment, an implicit mapping between transmission rank or modulation and coding scheme and the precoding granularity of non-codebook is predetermined.

In an embodiment, when a user equipment detects from higher layer signaling or PDCCH that it should use non-codebook precoding, it will determine the precoding granularity based on the allocated resource bandwidth or the transmission rank, or based on both. If the allocated resource comprises several clusters the precoding granularity can also depend on the bandwidth in each cluster. The mapping of allocated resources to precoding granularity may also be defined separately for cases with different transmission ranks.

One of the advantages of this method is that dynamic precoding granularity is realized without additional signaling and it can adapt to different resource allocation bandwidths and formats.

In step 500, an uplink transmission parameter is mapped to the precoding granularity of non-codebook precoding. The transmission parameter may comprise at least a resource bandwidth or transmission rank. In an embodiment, the precoding granularity is mapped as a function of the total number of physical resource blocks allocated to the user equipment uplink transmission.

In step 502, a transmission mode for a set of user equipment is determined. The transmission mode comprises non-codebook precoding.

In step 504, a transmission parameter is selected. The parameter comprises at least a resource bandwidth or transmission rank.

In step 506, the controller 228 of a eNodeB controls the transceiver 202 of the eNodeB to transmit information on the selected transmission parameter to the user equipment. In an embodiment, the information is included in an uplink grant message.

In an embodiment, the controller controls the transceiver to transmit user equipment information on a clustered resource wherein the bandwidth of each cluster is mapped to a given precoding granularity.

The mapping of step 500 can be made in various ways. The precoding granularity P may be denoted as P=f(N), where N is the total number of PRBs allocated to user equipment for uplink transmission.

If all resources allocated for the user equipment are in one continuous block, the granularity P may be calculated as $$P = \begin{cases} \text{the least divisor larger than } N_{PG} & \text{if } N \geq N_{WB} \\ N & \text{if } N < N_{WB}, \end{cases}$$

where $N_{PG}$ and $N_{WB}$ are defined in a non-limiting example as $N_{PG}$=2PRBs and $N_{WB}$=5PRBs.

Thus, the precoding granularity may be mapped as the least divisor of the total number of physical resource blocks larger than two of N and if the total number of physical resource blocks allocated to user equipment uplink transmission controller is larger than five. If the total number of physical resource blocks allocated to user equipment uplink transmission controller is less than five, the precoding granularity is mapped to be equal to the total number of physical resource blocks.

If the resources allocated for the user equipment are in more than one cluster, the granularity P may be calculated as P=the least common divisor larger than $N_{PG}$ of $\{N_i\}$, where $N_i$ is the number of PRBs in the ith cluster and $N_{PG}$=2PRBs in a non-limiting example.

Thus, the precoding granularity may be mapped as the least common divisor of $N_i$ larger than two, where $N_i$ is the total number of physical resource blocks allocated to the user equipment uplink transmission in cluster i.

For example, if the resources allocated for a UE comprise six continuous PRBs then the precoding granularity will be 2 PRBs according to the example above. For a set of user equipment located near the edge of a cell, the eNodeB can allocate a small resource block, e.g., 4 PRBs. In such a case, the precoding granularity will be 4 PRBs. In other words, wideband precoding is used for 4 PRBs, which will avoid cubic metric increase. This is beneficial for user equipment located near the edge of a cell.

In an embodiment, the mapping for user equipment with different transmission ranks could be different depending on several aspects. For example, we can assume cubic metric is not a problem for user equipment scheduled for high rank transmission. In these cases non-codebook precoding with fine granularity can be adopted to improve the performance.

For user equipment scheduled for low rank transmission, the user equipment may be located at the edge of a cell and have a transmission power limitation. In such a case wideband precoding may be used to avoid cubic metric increase.

In an embodiment, precoding granularity can be a function of both the number N of PRBs allocated and the transmission rank. For example, the mapping of precoding granularity P could be $$P = \begin{cases} \text{the least divisor larger than } N_{PG} & \text{if } N \geq N_{WB} \\ N & \text{if } N < N_{WB} \end{cases}$$

where $N_{PG}$ and $N_{WB}$ depend on the transmission rank. In a non-limiting example, $N_{PG}$ and $N_{WB}$ are defined as $N_{PG}$=2 PRBs, $N_{WB}$=5 PRBs if rank<3 and $N_{PG}$=1 PRB, $N_{WB}$=3 PRBs if rank≥3.

In an embodiment, precoding granularity is calculated per cluster based on the number of allocated PRBs per cluster. In an embodiment, modulation and coding scheme (MCS) indicator may be used to modify precoding granularity mapping instead of rank indicator.

The mapping of a transmission parameter is known by both the user equipment and the eNodeB, and the eNodeB will use proper channel estimation filter window size for precoding.

One of the advantages of the invention is that it enables the use of frequency selective non-codebook precoding at user equipment by setting up precoding granularity coordination between the user equipment and the eNodeB, thus, allowing for reasonably accurate channel estimation at the eNodeB.

One of the other advantages of the invention is that dynamic precoding granularity is realized without additional signaling and it can adapt to different resource allocation bandwidths and resource allocation types.

Figure 5B:
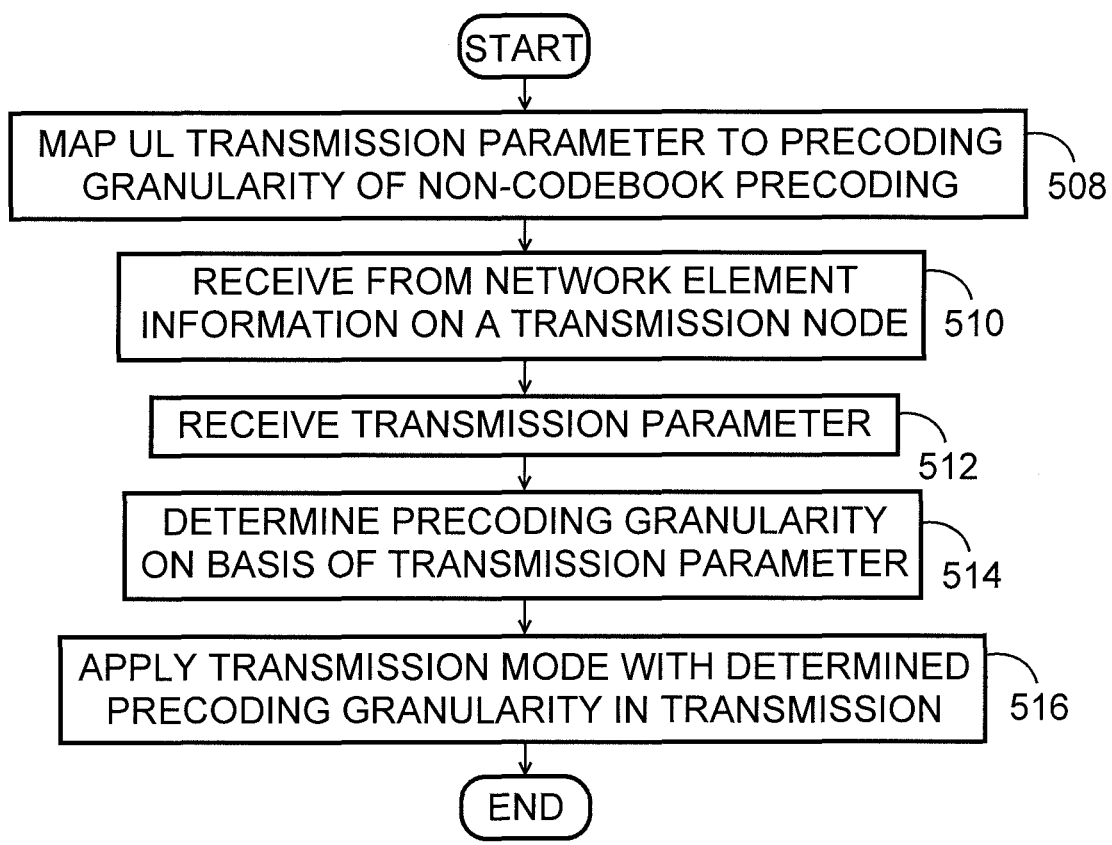

FIG. 5B is a flow chart illustrating an embodiment of the invention from the user equipment point of view.

In step 508, the controller 208 of the user equipment maps an uplink transmission parameter to precoding granularity of non-codebook precoding. The transmission parameter may comprise at least a resource bandwidth or transmission rank. In an embodiment, the precoding granularity is mapped as a function of the total number of physical resource blocks allocated to the user equipment uplink transmission. The information regarding mapping may have been received from an eNodeB as both the eNodeB and the user equipment have similar mappings.

In step 510, the transceiver 202 of the user equipment receives information on a transmission mode from a network element. The transmission mode comprises non-codebook precoding. The information may be received on a physical downlink control channel (PDCCH) or with higher layer signalling.

In step 512, the transceiver 202 of the user equipment receives a transmission parameter comprising at least a resource bandwidth or transmission rank. In an embodiment, the information is included in an uplink grant message.

In step 514, the controller 208 of the user equipment is configured to determine the precoding granularity on the basis of the transmission parameter utilizing the mapping information.

In step 516, the controller 208 of the user equipment is configured to control the transceiver to apply the transmission mode with the determined precoding granularity in transmission.

It should be understood that the apparatuses of FIGS. 2A and 2B are depicted herein as an example illustrating some embodiments. It is apparent to a person skilled in the art that the apparatuses may also comprise other functions and/or structures. Although the apparatuses have been depicted as single entities, different modules and memory may be implemented in one or more physical or logical entities.

An apparatus may be any server, node, host or corresponding component providing required functionality. The apparatus may also be a user device which is a piece of equipment or a device that associates, or is arranged to associate, the user device and its user with a subscription and allows a user to interact with a communications system. The user device presents information to the user and allows the user to input information. In other words, the user device may be any terminal capable of receiving information from and/or transmitting information to the network, connectable to the network wirelessly or via a fixed connection. Examples of the user devices include a personal computer, game console, laptop (notebook), personal digital assistant (PDA), pager, mobile television, mobile station, and line telephone.

The apparatuses of FIGS. 2A and 2B may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The apparatuses of FIGS. 2A and 2B may be implemented using at least one chipset or integrated circuit such as ASICs (application-specific integrated circuit).

Embodiments of the invention may be implemented as computer software executable by a processor, or as a combination of software and hardware.

An embodiment provides a computer program embodied on a distribution medium, comprising program instructions which, when loaded into an electronic apparatus, perform the actions of the controller, transmitter, receiver and other units of the apparatuses described earlier.

The computer program may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital computer or it may be distributed amongst a number of computers.

The steps, signaling messages and related functions described above are in no absolute chronological order, and some of the steps may be performed simultaneously or in an order differing from the given one. Other functions can also be executed between the steps or within the steps and other signaling messages sent between the illustrated messages. Some of the steps or part of the steps can also be left out or replaced by a corresponding step or part of the step.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising at least one processor and at least one memory including computer program code, the at least one memory and the computer program code being configured, with the at least one processor, to cause the apparatus to perform at least the following:
   determining a transmission mode for a user equipment, the transmission mode comprising a non-codebook precoding with a fixed precoding granularity; and
   controlling a transceiver to transmit information on the determined transmission mode to the user equipment, wherein the at least one memory and the computer program code are further configured to use one of a plurality of states in an uplink grant message reserved for indicating a precoding matrix index for indicating the transmission mode.

2. The apparatus of claim 1, wherein the at least one memory and the computer program code are further configured to perform indicating of the determined transmission mode to the user equipment in Layer 1 control information.

3. The apparatus of claim 1, wherein the at least one memory and the computer program code are further configured to use one bit of an uplink grant message for indicating the transmission mode.

4. The apparatus of claim 1, wherein the at least one memory and the computer program code are further configured to utilize a predefined scrambling code for scrambling downlink control information as an indication of the transmission mode.

5. An apparatus comprising at least one processor and at least one memory including computer program code, the at least one memory and the computer program code being configured, with the at least one processor, to cause the apparatus to perform at least the following:
   mapping an uplink transmission parameter comprising at least a resource bandwidth or a transmission rank to a precoding granularity for non-codebook precoding;
   determining a transmission mode for a user equipment, the transmission mode comprising the non-codebook precoding;
   selecting the uplink transmission parameter comprising at least the resource bandwidth or the transmission rank; and
   transmitting information on the selected uplink transmission parameter, wherein the at least one memory and the computer program code are configured to use one of a plurality of states in an uplink grant message reserved for indicating a precoding matrix index for indicating the transmission mode.

6. The apparatus of claim 5, wherein the at least one memory and the computer program code are further configured to control the transceiver to transmit user equipment information on a clustered resource, wherein a bandwidth of each respective cluster in the clustered resource is mapped to a corresponding precoding granularity.

7. The apparatus of claim 5, wherein the at least one memory and the computer program code are further configured to map the precoding granularity as a function of a total number of physical resource blocks allocated to a user equipment uplink transmission.

8. The apparatus of claim 7, wherein in response to the resource allocated to a given user equipment being in more than one cluster, the at least one memory and the computer program code are configured to map the precoding granularity as a function of N1, where N1 is the total number of physical resource blocks allocated to the user equipment uplink transmission in cluster i.

9. The apparatus of claim 5, wherein the at least one memory and the computer program code are configured to map the precoding granularity as a function of both a total number of physical resource blocks allocated to a user equipment uplink transmission, and the transmission rank of the user equipment.

10. An apparatus comprising:
   a transceiver configured to receive from a network element information on a transmission mode, the transmission mode comprising non-codebook precoding with a fixed precoding granularity; and
   a controller configured to control the transceiver to apply the transmission mode with the fixed precoding granularity in transmission, wherein the apparatus is further configured to detect the transmission mode from a predefined state of a plurality of states in an uplink grant message reserved for indicating a precoding matrix index for indicating the transmission mode.

11. The apparatus of claim 10, wherein the apparatus is further configured to detect the transmission mode from a predefined value of a bit in an uplink grant message.

12. The apparatus of claim 10, wherein the apparatus is further configured to detect the transmission mode from a predefined scrambling code used for scrambling downlink control information.

13. An apparatus comprising:
a controller configured to map an uplink transmission parameter comprising at least a resource bandwidth or a transmission rank to a precoding granularity for non-codebook precoding;
a transceiver operatively coupled to the controller, the transceiver configured to receive from a network element information on a transmission mode, the transmission mode comprising non-codebook precoding; the transceiver further configured to receive the uplink transmission parameter comprising at least a resource bandwidth or a transmission rank; wherein the apparatus being configured to
  determine the precoding granularity on the basis of the uplink transmission parameter;
  use one of a plurality of states in an uplink grant message reserved for indicating a precoding matrix index for indicating the transmission mode; and
  control the transceiver to apply the transmission mode with the determined precoding granularity in transmission.

14. The apparatus of claim 13, wherein the controller is further configured to map the precoding granularity as a function of a total number of physical resource blocks in each of a plurality of allocated clusters.

15. The apparatus of claim 13, wherein the controller is further configured to map the precoding granularity as a function of both a total number of physical resource blocks allocated to an uplink transmission of the apparatus, and the transmission rank of the apparatus.

16. A method comprising
determining a transmission mode for a user equipment, the transmission mode comprising a non-codebook precoding with a fixed precoding granularity;
using one of a plurality of states in an uplink grant message reserved for indicating a precoding matrix index for indicating the transmission mode; and
transmitting information on the determined transmission mode to the user equipment.

17. The method of claim 16, further comprising: indicating the determined transmission mode to the user equipment in Layer 1 control information.

18. The method of claim 16, further comprising using one bit of an uplink grant message for indicating the transmission mode.

19. The method of claim 16, further comprising utilizing a predefined scrambling code for scrambling downlink control information as an indication of the transmission mode.

20. A method comprising:
mapping an uplink transmission parameter comprising at least a resource bandwidth or a transmission rank to a precoding granularity for non-codebook precoding;
determining a transmission mode for a user equipment, the transmission mode comprising the non-codebook precoding;
selecting the uplink transmission parameter to comprise at least a resource bandwidth or a transmission rank;
using one of a plurality of states in an uplink grant message reserved for indicating a precoding matrix index for indicating the transmission mode; and
controlling a transceiver to transmit information on the selected uplink transmission parameter.

21. The method of claim 20, further comprising controlling the transceiver to transmit user equipment information on a clustered resource wherein the bandwidth of each respective cluster of the clustered resource is mapped to a corresponding precoding granularity.

22. The method of claim 20, further comprising mapping the precoding granularity as a function of a total number of physical resource blocks allocated to a user equipment uplink transmission.

23. The method of claim 20, further comprising mapping the precoding granularity as a function of N1, where N1 is a total number of physical resource blocks allocated to a user equipment uplink transmission in cluster i if the resource allocated to a given user equipment is in more than one cluster.

24. The apparatus of claim 20, further comprising mapping the precoding granularity as a function of both a total number of physical resource blocks allocated to a user equipment uplink transmission and the transmission rank of the user equipment.

25. A method comprising:
receiving from a network element information on a transmission mode, the transmission mode comprising a non-codebook precoding with a fixed precoding granularity;
detecting the transmission mode from a predefined state of a plurality of states in the uplink grant message reserved for indicating a precoding matrix index for indicating the transmission mode; and
applying the transmission mode with the fixed precoding granularity in transmission.

26. The method of claim 25, further comprising detecting the transmission mode from a predefined value of a bit in an uplink grant message.

27. The method of claim 25, further comprising detecting the transmission mode from a predefined scrambling code used for scrambling downlink control information.

28. A method comprising:
mapping an uplink transmission parameter comprising at least a resource bandwidth or a transmission rank to a precoding granularity for non-codebook precoding;
receiving from a network element information on a transmission mode, the transmission mode comprising the non-codebook precoding;
receiving the uplink transmission parameter comprising at least the resource bandwidth or the transmission rank;
detecting the transmission mode from a predefined state of a plurality of states in the uplink grant message reserved for indicating a precoding matrix index for indicating the transmission mode;
determining the precoding granularity on the basis of the transmission parameter; and
controlling the transceiver to apply the transmission mode with the determined precoding granularity in transmission.

29. An article of manufacture comprising a non-transitory computer readable medium embodying program instructions thereon executable by a computer device operably coupled to the computer readable medium which, when executed by the computer device, to perform
determining a transmission mode for a user equipment, the transmission mode comprising a non-codebook precoding with a fixed precoding granularity;
using one of a plurality of states in an uplink grant message reserved for indicating a precoding matrix index for indicating the transmission mode; and transmitting information on the determined transmission mode to the user equipment.

* * * * *